United States Patent
Lin et al.

(10) Patent No.: US 11,659,576 B2
(45) Date of Patent: May 23, 2023

(54) METHOD OF PHYSICAL UPLINK SHARED CHANNEL REPETITION AND RELATED DEVICE

(71) Applicant: FG Innovation Company Limited, Tuen Mun (HK)

(72) Inventors: Wan-Chen Lin, Taipei (TW); Yu-Hsin Cheng, Taipei (TW); Chia-Hung Wei, Taipei (TW); Hsin-Hsi Tsai, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 9 days.

(21) Appl. No.: 16/992,509

(22) Filed: Aug. 13, 2020

(65) Prior Publication Data

US 2021/0051669 A1 Feb. 18, 2021

Related U.S. Application Data

(60) Provisional application No. 62/886,779, filed on Aug. 14, 2019.

(51) Int. Cl.
*H04W 4/00* (2018.01)
*H04W 72/53* (2023.01)
(Continued)

(52) U.S. Cl.
CPC ....... *H04W 72/53* (2023.01); *H04W 72/0446* (2013.01); *H04W 72/21* (2023.01); *H04W 76/27* (2018.02)

(58) Field of Classification Search
CPC ......... H04W 72/0446; H04W 72/0413; H04W 72/042; H04L 5/0055; H04L 5/0094
See application file for complete search history.

(56) References Cited

U.S. PATENT DOCUMENTS

| | | | | |
|---|---|---|---|---|
| 2020/0145143 | A1* | 5/2020 | Nemeth | H04W 72/0406 |
| 2021/0282137 | A1* | 9/2021 | Wang | H04W 72/0446 |

OTHER PUBLICATIONS

3GPP TS 38.213 V15.6.0 (Jun. 2019); 3GPP Technical Specification Group Radio Access Network; NR; Physical layer procedures for control; (Release 15); 650 Route des Lucioles—Sophia Antipolis; Valbonne—France.

* cited by examiner

*Primary Examiner* — Bo Hui A Zhu
(74) *Attorney, Agent, or Firm* — ScienBiziP, P.C.

(57) ABSTRACT

A method of a physical uplink shared channel (PUSCH) repetition performed by a user equipment (UE) is disclosed. The method comprises receiving, from a base station (BS), a configuration for a first PUSCH transmission, in case a Radio Resource Control (RRC) message including information to configure a slot-based repetition operation for the first PUSCH transmission is received from the BS, not receiving, from the BS, an RRC message including information to configure a non-slot based repetition operation for a second PUSCH transmission during the first PUSCH transmission with the slot-based repetition operation, and in case an RRC message including information to configure a non-slot based repetition operation for the second PUSCH transmission is received from the BS, not receiving, from BS, an RRC message including information to configure a slot-based repetition operation for the first PUSCH transmission during the second PUSCH transmission with the non-slot based repetition operation.

6 Claims, 3 Drawing Sheets

(51) Int. Cl.
*H04W 72/0446* (2023.01)
*H04W 76/27* (2018.01)
*H04W 72/21* (2023.01)

METHOD OF PHYSICAL UPLINK SHARED CHANNEL REPETITION AND RELATED DEVICE

CROSS-REFERENCE TO RELATED APPLICATION(S)

The present disclosure claims the benefit of and priority to U.S. provisional Patent Application Ser. No. 62/886,779 filed on Aug. 14, 2019, entitled "Handling of the indication for enhanced PUSCH repetition," (hereinafter referred to as "the '779 provisional"). The disclosure of the '779 provisional is hereby incorporated fully by reference into the present disclosure.

FIELD

The present disclosure generally relates to wireless communications, and more particularly, to a method of physical uplink shared channel (PUSCH) repetition and a related device.

BACKGROUND

For low latency requirements, a dynamic grant or configured grant may schedule PUSCH repetitions in one slot (e.g., slot-based scheduling), or across slot boundary in consecutive available slots (e.g., non-slot based scheduling). In other words, PUSCH repetitions with a slot-based operation (or called slot-based PUSCH repetitions) and PUSCH repetitions with non-slot based operation (or called non-slot based PUSCH repetitions) may be applied to a user equipment (UE).

In 3GPP Rel-15 TS 38.214 technical standard, for a single layer repetition, slot-based PUSCH repetitions, if a UE is configured with "pusch-AggregationFactor" of the radio resource control (RRC) signaling, the UE shall repeat a PUSCH transmission across the number of "pusch-AggregationFactor" of consecutive slots that uses the same symbol allocation in each slot. For a non-slot based PUSCH repetition, since the PUSCH repetition may be across the slot boundary, the time domain resource allocation for a PUSCH transmission is indicated by a starting symbol 'S' relative to the start of a slot, and the number of consecutive symbols 'L' counting from the symbol 'S'. In addition, the number of PUSCH repetitions shall be larger than 1.

Moreover, in 3GPP Rel-15 TS 38.331 technical standard, if "pusch-AggregationFactor" is absent in the "PUSCH-Config" of the RRC signaling, the UE may apply value '1' for the slot-based PUSCH repetitions. However, there is no specification to configure the non-slot based PUSCH repetitions for a UE when the UE is transmitting the slot-based PUSCH repetitions (e.g., either the slot-based PUSCH repetitions is explicitly configured to the UE or "pusch-AggregationFactor" is absent).

Besides, in 3GPP Rel-16, the multi-transmission/reception (TRP) based physical downlink shared channel (PDSCH) repetition for a time domain has been supported. Thus, a corresponding UE behavior shall be disclosed.

SUMMARY

The present disclosure provides a method of a PUSCH repetition and a related device.

According to an aspect of the present disclosure, a method of a physical uplink shared channel (PUSCH) repetition performed by a user equipment (UE) is provided. The method comprises receiving, from a base station (BS), a configuration for a first PUSCH transmission, in case a Radio Resource Control (RRC) message including information to configure a slot-based repetition operation for the first PUSCH transmission is received from the BS, not receiving, from the BS, an RRC message including information to configure a non-slot based repetition operation for a second PUSCH transmission during the first PUSCH transmission with the slot-based repetition operation, and in case an RRC message including information to configure a non-slot based repetition operation for the second PUSCH transmission is received from the BS, not receiving, from BS, an RRC message including information to configure a slot-based repetition operation for the first PUSCH transmission during the second PUSCH transmission with the non-slot based repetition operation.

According to another aspect of the present disclosure, a method of a physical uplink shared channel (PUSCH) repetition performed by a base station (BS) is provided. The method comprises transmitting, to a user equipment (UE), a configuration for a first PUSCH transmission, in case that a Radio Resource Control (RRC) message including information to configure a slot-based repetition operation for the first PUSCH transmission is transmitted to the UE, not configuring, the UE, with a non-slot based repetition operation for a second PUSCH transmission during the first PUSCH transmission with the slot-based repetition operation, and in case that an RRC message including information to configure a non-slot based repetition operation for the second PUSCH transmission is transmitted to the UE, not configuring, the UE, with a slot-based repetition operation for the first PUSCH transmission during the second PUSCH transmission with the non-slot based repetition operation.

According to another aspect of the present disclosure, a user equipment (UE) for a physical uplink shared channel (PUSCH) repetition is provided. The UE comprises a processor, for executing computer-executable instructions, and a non-transitory machine-readable medium, coupled to the processor, for storing the computer-executable instructions, wherein the computer-executable instructions instruct the processor to receive, from a base station (BS), a configuration for a first PUSCH transmission, in case a Radio Resource Control (RRC) message including information to configure a slot-based repetition operation for the first PUSCH transmission is received from the BS, not receive, from the BS, an RRC message including information to configure a non-slot based repetition operation for a second PUSCH transmission during the first PUSCH transmission with the slot-based repetition operation, and in case an RRC message including information to configure a non-slot based repetition operation for the second PUSCH transmission is received from the BS, not receive, from BS, an RRC message including information to configure a slot-based repetition operation for the first PUSCH transmission during the second PUSCH transmission with the non-slot based repetition operation.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DESCRIPTION

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "In one embodiment", "In one implementation", "In one alternative" etc., in the following disclosure refers to just one possible example that would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system typically includes at least one base station (BS), at least one UE, and one or more optional network elements that provide connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), a Next Generation (NG)-eNB as in an Evolved Universal Terrestrial Radio Access (E-UTRA) BS in connection with the 5GC, a gNB as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink (DL) and optionally UL resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR V2X services. Each cell may have overlapped coverage areas with other cells.

Figure 1:
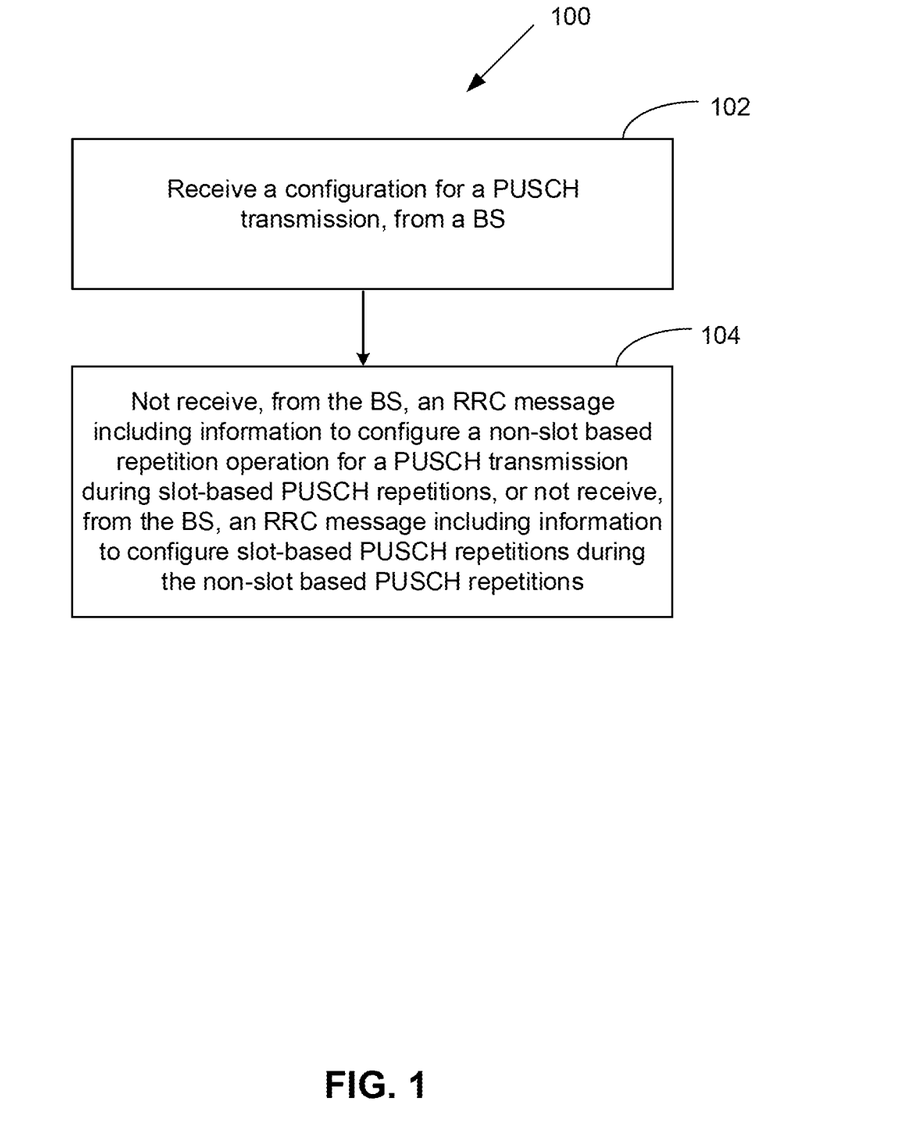
FIG. 1 is a flowchart illustrating a configuration operation of PUSCH repetitions, in accordance with example implementations of the present disclosure.

FIG. 1 illustrates a method 100 for a UE to perform PUSCH repetitions. In action 102, the UE receives a configuration for a PUSCH transmission, from a BS. In one example, the configuration may be a dynamic grant (e.g., a physical downlink control channel (PDCCH) scheduling for a PUSCH transmission) or a configured grant that schedules a PUSCH transmission. In action 104, when the UE receives a radio resource control (RRC) message including information to configure a slot-based repetition operation for the PUSCH transmission ("slot-based PUSCH repetitions") from the BS, the UE does not receive, from the BS, an RRC message including information to configure a non-slot based repetition operation for a PUSCH transmission ("non-slot based PUSCH repetitions") during the slot-based PUSCH repetitions, or when the UE receives an RRC message including information to configure a non-slot based PUSCH repetition from the BS, the UE does not receive, from the BS, an RRC message including information to configure slot-based PUSCH repetitions during the non-slot based PUSCH repetitions.

On the other hand, the BS may not configure the UE with a non-slot based PUSCH repetition during slot-based PUSCH repetitions (e.g., when the UE performs slot-based PUSCH repetitions), or the BS may not configure the UE with slot-based PUSCH repetitions during a non-slot based PUSCH repetition (e.g., when the UE performs a non-slot based PUSCH repetition).

Based on the configuration mechanism of PUSCH repetitions mentioned above, if a specific parameter of an RRC message or a specific configuration for a non-slot based PUSCH repetition is assigned to or present in the UE, the UE does not expect to be configured a slot-based PUSCH repetition by a higher layer. Or, if a specific parameter of an RRC message or a specific configuration for a slot-based PUSCH repetition is assigned to or present in the UE, the UE does not expect to be configured a non-slot based PUSCH repetition by a higher layer. On the other hand, if the BS configures non-slot based PUSCH repetitions to the UE (e.g., via a specific parameter of an RRC message or a specific configuration), the BS may not configure a slot-based PUSCH repetition to the UE. Or, if the BS configures slot-based PUSCH repetitions to the UE, the BS may not configure a non-slot based PUSCH repetition to the UE.

In one example, for the slot-based PUSCH repetitions, the same symbol allocation may be applied across the multiple consecutive slots and the PUSCH transmission is limited to a single transmission layer. In one example, for the slot-based PUSCH repetitions, the same symbol allocation may be applied across the multiple consecutive slots and the PUSCH transmission is transmitted to different TRPs/panels or transmitted from different panels. Specifically, the first PUSCH repetition is transmitted to one TRP/panel or transmitted from one panel, and the second PUSCH repetition is transmitted to the other TRP/panel or transmitted from the other panel. In one example, for the non-slot based PUSCH repetitions, the same symbol allocation may be applied to each repetition within a slot and the PUSCH transmission is transmitted to different TRPs/panels and/or transmitted from different panels. In one example, for the non-slot based PUSCH repetitions, the same symbol allocation may be applied to each nominal repetition and the PUSCH transmission is transmitted to different TRPs/panels and/or transmitted from different panels. Specifically, the nominal repetition may refer to the repetition configured by a higher layer without crossing an invalid symbol. In one example, parameters for configuring a slot-based PUSCH repetition may include parameters other than "pusch-AggregationFactor" or/and "repK".

Moreover, a non-slot based PUSCH repetition may be configured based on the following indications.

1. New Downlink Control Information (DCI) Format

Since the reliability for the control channel is important to ensure a UE receives the right scheduling instruction for data transmission, especially for Ultra-Reliable Low-Latency Communication (URLLC) data, a new DCI format (e.g. a compact DCI) may be used to schedule the URLLC transmission.

In one example, if PUSCH repetitions are scheduled by the new DCI format, regardless of what kind of PUSCH repetitions are configured by the RRC message, the PUSCH repetitions may be regarded as the non-slot based PUSCH repetition. In other words, though PUSCH repetitions may or may not be configured by a higher layer, after receiving the new DCI scheduling the PUSCH repetitions, the UE may perform the PUSCH repetitions according to the indication from the new DCI (e.g., the number of repetitions, a time domain resource allocation (TDRA) table, a start, and length indicator value (SLIV)). Thus, the new DCI format may include a specific indication for non-slot based PUSCH repetitions.

In another example, if PUSCH repetitions are configured by a higher layer (e.g., "pusch-AggregationFactor-URLLC"), the new DCI format may be used for triggering the non-slot based PUSCH repetitions. More specifically, the field in the new DCI may not include a specific indication for non-slot based PUSCH repetition.

2. Specific Field in a DCI

In one example, a specific field may be an existing field in the DCI (e.g., TDRA table, SLIV, the number of repetitions), and is used as an indication of the non-slot based PUSCH repetition. More specifically, there may be one bit to indicate whether the UE shall determine the existing field in the DCI as an indication of the non-slot based PUSCH repetitions. For example, if the specific field is set to '0', the UE may determine this field (e.g., TDRA table) remaining the same functionality as in 3GPP Rel-15 specification. If the specific field is set to '1', the UE may determine this field (e.g., TDRA table) as an indication of non-slot based PUSCH repetition. More specifically, 4 bits in a TDRA field in a DCI may be used for indicating different indexes in the TDRA table/list. For example, value '0' in the DCI may refer to the seventh element in the TDRA list/table, value '1' in the DCI may refer to the eighteenth element in the TDRA list/table, and so on.

3. Bit-Width of a DCI

In one example, if a bit-width of a DCI corresponding to a time domain resource assignment is larger than 4 bits, the UE may determine the PUSCH repetitions scheduled by the DCI as the non-slot based PUSCH repetitions.

4. DCI with Cyclic Redundancy Check (CRC) Scrambled with a New Radio Network Temporary Identifier (RNTI)

In one example, if PUSCH repetitions are scheduled by a DCI with CRC scrambled with a new-RNTI, the UE may determine the PUSCH repetitions as non-slot based PUSCH repetitions. Moreover, when the DCI with CRC scrambled with the new-RNTI is received, an existing field in the DCI may be re-interpreted further. For example, the TDRA field may be used for indicating different indexes in a TDRA table/list. Value '0' in the DCI may refer to the seventh element in the TDRA list/table, value '1' may refer to the eighteenth element in the TDRA list/table, and so on.

5. In the current 3GPP Rel-15 specification, at most 16 entries can be configured in a TDRA table. In this case, a DCI is used for indicating which entry shall be applied. In other words, at most 4 bits shall be used for the TDRA field in the DCI. Either a default PUSCH time allocation table is applied, or the higher layer configured "pusch-TimeDomainAllocationList" in either "pusch-ConfigCommon" or "pusch-Config" is applied. Furthermore, from integer 0-127, the range of index of the TDRA table giving valid combinations of start symbol and length as start and length indicator in "PUSCH-TimeDomainResourceAllocation", at most 16 elements can be included in "pusch-TimeDomainAllocationList".

In one example, more than two TDRA tables may be simultaneously configured to the UE. In this case, if one of the TDRA tables is a new TDRA table other than the TDRA table in the 3GPP Rel-15 specification (e.g., a default PUSCH TDRA table (e.g., as defined in table 6.1.2.1.1-2 and table 6.1.2.1.1-3 of 3GPP TS 38.214 technical standard), the UE may determine the new TDRA table as an indication for the non-slot-based PUSCH repetitions.

In another example, once the new TDRA table is configured for a cell group, a serving cell, or a bandwidth part (BWP), the UE may determine the new TDRA table as an implicit indication from the gNB. That is, the UE may determine PUSCH repetitions on the cell group, serving cell or BWP as non-slot-based PUSCH repetitions when the implicit indication is received from the gNB.

6. Number of Entries in TDRA Table

In one example, if more than 16 entries in a TDRA table are configured to the UE, the UE may determine the TDRA table as an indication for non-slot-based PUSCH repetitions.

7. SLIV Range

In one example, if a range of SLIV is out of 0-127, the UE may determine this is an indication for the non-slot-based PUSCH repetitions.

8. Specific Value of SLIV

In one example, if unused values (e.g., 105-127) in the TDRA table, are used as indexes giving valid combinations of start symbol and length for PUSCH repetitions, the UE may determine this is an indication for non-slot based PUSCH repetitions.

9. Specific BWP

In one example, if PUSCH repetitions on a specific BWP are scheduled by a DCI, the UE may determine this is an indication for non-slot-based PUSCH repetitions.

In one example, if PUSCH repetitions are scheduled by a DCI, where the DCI is monitored on a specific BWP, the UE may determine this is an indication for non-slot-based PUSCH repetitions.

10. Specific Search Space or Control Resource Set (CORESET)

In one example, if PUSCH repetitions are scheduled by a DCI, where the DCI is monitored on a specific search space or CORESET, the UE may determine this is an indication for non-slot-based PUSCH repetitions.

11. In the 3GPP Rel-15 specification, for a dynamic PUSCH transmission, "pusch-AggregationFactor" that is set to '1' is not explicitly configured to the UE. If "pusch-AggregationFactor" is absent, the UE automatically applies value '1' for slot-based PUSCH repetitions. However, the number of repetitions that is set to '1' may be one of the candidates in "pusch-AggregationFactor" or other possible parameters for PUSCH repetitions. In one example, some possible parameters for a PUSCH repetition may be configured in "PUSCH-Config", "ConfiguredGrant-Config" or other configurations related to the multi-TRP/panel based PUSCH transmission. In addition, for a configured grant, parameter "repK" (referred to as to the number of repetitions) that is set to '1' may be configured to the UE and used as an indication for non-slot based PUSCH repetitions.

In one example, for a dynamic PUSCH transmission, if the number of repetitions that is set to '1' (or a specific value that is not 2, 4, or 8) is configured by a higher layer rather than applying '1' based on the absence of "pusch-AggregationFactor", the UE may determine this is an indication for non-slot based PUSCH repetitions. More specifically, in this case, if "pusch-AggregationFactor" is set to 1, 2, 4, or 8, and a TDRA field in a DCI indicates that the UE applies value '1', the UE may determine that the dynamic PUSCH transmission is a non-slot based PUSCH repetition. If "pusch-AggregationFactor" is absent, the UE may apply value '1' and may determine that the dynamic PUSCH transmission is one-shot transmission. In other examples, if the number of repetitions set to '1' is configured in other parameters, the UE may apply value '1' and determine the dynamic PUSCH transmission as a non-slot based PUSCH repetition.

In some examples, for a configured grant, if parameter "repK" is an optional parameter configured by a higher layer and is set to '1' (or a specific value which is not 2, 4, or 8), the UE may determine this is an indication for non-slot based PUSCH repetitions. On the other hand, when "repK" is an optional parameter and is absent, the UE may determine this is an indication for one-shot transmission. Otherwise, when "repK" is an optional parameter and is set to value '1', the UE may determine this is an indication for non-slot based PUSCH repetitions.

12. The Granularity of K2 Value

In the 3GPP Rel-15 specification, a slot where a UE may perform a PUSCH transmission is determined according to a slot offset 'K2'. Thus, 'K2' is a slot unit. However, for URLLC transmission, 'K2' may be a non-slot unit to meet the low latency requirement. 'K2' as a slot offset or a non-slot offset may be indicated by a DCI or higher layer. For example, if a PUSCH transmission is indicated by a new DCI, the UE may determine 'K2' is in the non-slot unit.

In one example, if the 'K2' is indicated as a non-slot unit, the corresponding scheduled PUSCH repetitions may be determined as non-slot based PUSCH repetitions.

In one example, if the 'K2' is indicated as a value of zero, the corresponding scheduled PUSCH repetitions may be determined as non-slot based PUSCH repetitions.

In one example, if a new TDRA table is applied and the 'K2' in the new TDRA table is at a symbol level, the corresponding scheduled PUSCH repetitions may be determined as non-slot-based PUSCH repetitions.

13. Specific Parameter/Configuration

When a specific parameter or a specific configuration for non-slot based PUSCH repetitions is present for a UE, the UE does not expect to be configured slot-based PUSCH repetitions by a higher layer simultaneously. If a parameter or a configuration for slot-based PUSCH repetitions and a parameter or a configuration for non-slot based repetition are simultaneously present, the UE may determine this is an error case.

In one example, the specific parameter may be configured in "PUSCH-Config", "ConfiguredGrant-Config" or other configurations related to the multi-TRP/panel based PUSCH transmission.

In one example, if a specific parameter (e.g., pusch-TimeDomainAllocationList-URLLC) for a PUSCH transmission is configured, the UE may determine the specific parameter is used for non-slot based PUSCH repetitions.

In one example, if a specific configuration (e.g., pusch-repetitionConfig) is configured for a PUSCH transmission, the UE may determine the specific configuration is used for non-slot based PUSCH repetitions.

Moreover, after a UE receives an indication mentioned above for non-slot based PUSCH repetitions, the UE may determine to:

1. Apply a new TDRA table (e.g., a table other than the table in the 3GPP Rel-15 specification), for a PUSCH transmission.

2. Re-interpret a configured SLIV in a TDRA list. For example, if a SLIV that is set to '3' is in the TDRA list, this value may correspond to different combinations of a start symbol and a length by applying different formulas.

3. Exclude invalid entries in a TDRA list or TDRA table. For example, if the number of repetitions is indicated as '1', all combinations of S+L<14 may be excluded.

4. Not receive TDRA entries or parameters corresponding to slot-based scheduling. For example, a start symbol is too late to meet a latency requirement or S+L<14 while the number of repetitions is set to '1'. It is noted that the action of "not receive" means these entries may not be configured in the TDRA list or TDRA table.

Figure 2:
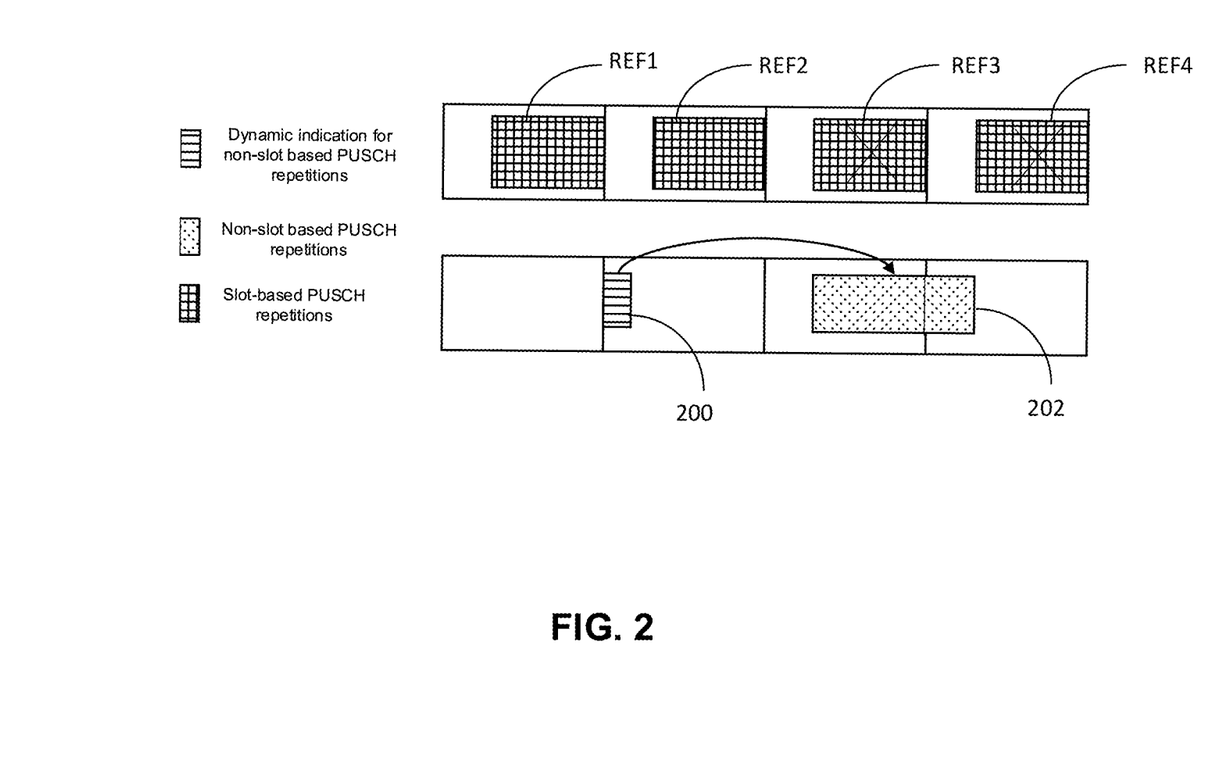
FIG. 2 is a schematic diagram illustrating a dynamic indication being configured for a non-slot based PUSCH repetition during slot-based PUSCH repetition, in accordance with example implementations of the present disclosure.

The present disclosure provides a UE's behavior in a case that the UE simultaneously receives different configurations (e.g., slot-based PUSCH repetitions and non-slot based PUSCH repetitions). With reference to FIG. 2, the UE may receive a configuration of non-slot based PUSCH repetitions during an operation of slot-based PUSCH repetitions.

As illustrated in FIG. 2, slot-based PUSCH repetitions REF1-REF4 are configured by a higher layer, a non-slot based PUSCH repetition 202 may be indicated dynamically (e.g., through DCI signaling). Actions for a UE being configured with different scheduling types for different transport blocks (TBs) are disclosed.

If the UE is configured with "pusch-AggregationFactor" that is set to '4', the UE determines a dynamic indication 200 for non-slot based PUSCH repetitions is received, so that the non-slot based PUSCH repetitions may be started from a slot which is supposed to be the third slot-based PUSCH repetition REF3.

In one example, a PUSCH transmission in a slot of a multi-slot PUSCH transmission may be omitted after the UE receives a dynamic indication for non-slot based PUSCH repetitions. More specifically, as illustrated in FIG. 2, the third slot-based repetition REF3 may be omitted accordingly. In this case, once the dynamic indication 200 is received, the rest of the slot-based PUSCH repetitions (e.g., the unfinished slot-based PUSCH repetitions, such as the third and fourth slot-based PUSCH repetitions REF3-REF4) may be omitted. In another example, once the dynamic indication 200 is received, only the slot-based PUSCH repetitions REF3 that collide with the indicated non-slot based transmission 202 may be omitted.

In one example, when a slot-based PUSCH repetition and a non-slot based PUSCH repetition scheduled by a DCI are configured in the same slot, the slot-based PUSCH repetition in the slot may be omitted by the UE during a Hybrid Automatic Repeat Request (HARD) process.

In one example, the number of repetitions may be reset when the UE receives a dynamic indication for non-slot based PUSCH repetitions. More specifically, as illustrated in FIG. 2, the UE may reset the number of repetitions in the third slot-based PUSCH repetition REF3 and determine the fourth slot-based PUSCH repetition REF4 as the first repetition for slot-based PUSCH repetitions. In other words, a gNB may schedule a retransmission of the slot-based PUSCH repetition once the slot-based PUSCH repetition is interrupted by the non-slot based PUSCH repetitions.

In one example, when a dynamic indication for non-slot based PUSCH repetitions is received and a TB has collided with configured slot-based PUSCH repetitions, the UE may postpone the configured slot-based PUSCH repetitions. For example, as illustrated in FIG. 2, the UE may perform the third slot-based PUSCH repetition REF3 in the fourth slot, and the next repetition may be performed in the fifth slot until the number of PUSCH transmission reaches the required number of repetitions.

In one example, if a reconfiguration of PUSCH repetitions is not allowed, a parameter related to PUSCH repetitions may be re-interpreted when a dynamic indication for non-slot based PUSCH repetitions is received. More specifically, "pusch-AggregationFactor" may be determined as the number of repetitions for non-slot based PUSCH repetitions or the combinations of a start symbol and a length may apply another rule for non-slot based PUSCH repetitions.

In one example, a parameter related to slot-based PUSCH repetitions may be ignored. In this case, the UE may apply a parameter related to non-slot based PUSCH repetitions or configuration accordingly. More specifically, the slot-based PUSCH repetitions may be terminated when the parameter for the non-slot based PUSCH repetitions is received.

In one example, if a dynamic indication for non-slot based PUSCH repetition indicates 2 times repetition. The UE may perform the non-slot based PUSCH repetition for 2 times in each slot, and on the resources for slot-based PUSCH repetition. Furthermore, the UE may perform the non-slot based PUSCH repetitions on the resources that are scheduled for slot-based PUSCH repetitions. In other words, the UE may repeat the TB for 8 times, 2 times in each slot, and repeat the TB across 4 consecutive slots.

Figure 3:
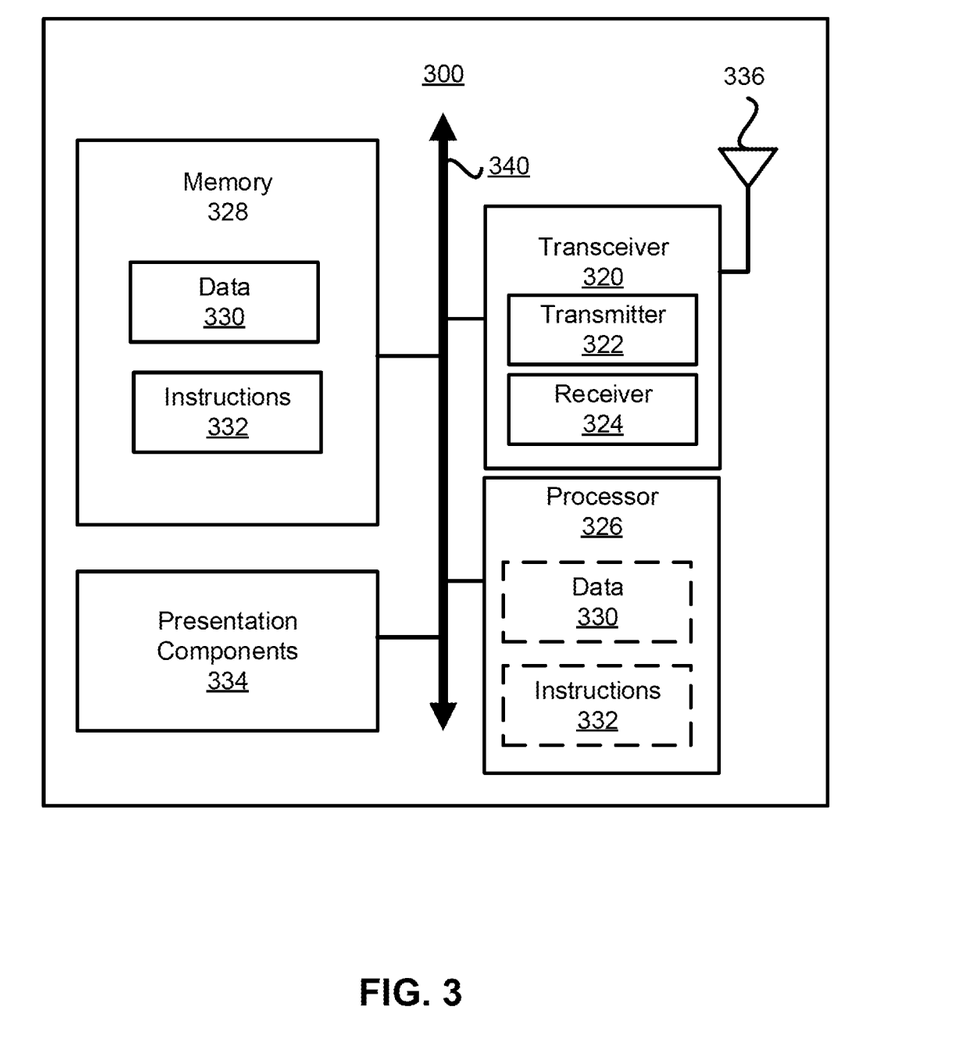
FIG. 3 is a block diagram illustrating a node for wireless communication, in accordance with example implementations of the present disclosure.

FIG. 3 illustrates a node 300 for wireless communication according to the present disclosure.

As illustrated in FIG. 3, the node 300 may include a transceiver 320, a processor 326, memory 328, one or more presentation components 334, and at least one antenna 336. The node 300 may also include a Radio Frequency (RF) spectrum band module, a BS communications module, a network communications module, and a system communications management module, input/output (I/O) ports, I/O components, and a power supply (not illustrated). Each of these components may be in communication with each other, directly or indirectly, over one or more buses 340. The node 300 may be a UE that performs various disclosed functions as illustrated in FIG. 1.

The transceiver 320 includes a transmitter 322 (with transmitting circuitry) and a receiver 324 (with receiving circuitry) and may be configured to transmit and/or receive time and/or frequency resource partitioning information. The transceiver 320 may be configured to transmit in different types of subframes and slots including, but not limited to, usable, non-usable and flexibly usable subframes and slot formats. The transceiver 320 may be configured to receive data and control channels.

The node 300 may include a variety of computer-readable media. Computer-readable media may be any media that can be accessed by the node 300 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, RF, infrared and other wireless media. Combinations of any of the disclosed media should be included within the scope of computer-readable media.

The memory 328 may include computer-storage media in the form of volatile and/or non-volatile memory. The memory 328 may be removable, non-removable, or a combination thereof. Memory includes solid-state memory, hard drives, and optical-disc drives. As illustrated in FIG. 3, the memory 328 may store computer-readable, computer-executable instructions 332 (e.g., software codes) that are configured to cause the processor 326 (e.g., processing circuitry) to perform various disclosed functions. Alternatively, the instructions 332 may be configured to cause the node 300 (e.g., when compiled and executed) to perform various disclosed functions.

The processor 326 may include an intelligent hardware device (e.g., a central processing unit (CPU), a microcontroller, an Application Specific Integrated Circuit (ASIC), etc.). The processor 326 may include memory. The processor 326 may process the data 330 and the instructions 332 received from the memory 328, and information received via the transceiver 320, the baseband communications module, and/or the network communications module. The processor 326 may also process information to be sent to the transceiver 320 for transmission via the antenna 336, to the network communications module for transmission to a CN.

One or more presentation components 334 present data to a person or other device. Presentation components 334 include a display device, speaker, printing component, and vibrating component.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method of a physical uplink shared channel (PUSCH) repetition operation performed by a user equipment (UE), the method comprising:
   receiving, from a base station (BS), a first Radio Resource Control (RRC) message for configuring a first PUSCH transmission;
   performing the first PUSCH transmission;
   in a case that the first RRC message includes information to configure a slot-based repetition operation for the first PUSCH transmission, not receiving, from the BS, during the first PUSCH transmission, a second RRC message including information to configure a non-slot-based repetition operation for a second PUSCH transmission; and
   in a case that the first RRC message includes information to configure a non-slot-based repetition operation, not receiving, from the BS, during the first PUSCH transmission, a second RRC message including information to configure a slot-based repetition operation for the second PUSCH transmission.

2. The method of claim 1, wherein the information to configure the non-slot-based repetition operation or the information to configure the slot-based repetition operation is indicated by an RRC parameter included in the first RRC message.

3. A method of a physical uplink shared channel (PUSCH) repetition operation performed by a base station (BS), the method comprising:
   transmitting, to a user equipment (UE), a first radio resource control (RRC) message for configuring a first PUSCH transmission;
   receiving, from the UE, the first PUSCH transmission;
   in a case that the first RRC message includes information to configure a slot-based repetition operation for the first PUSCH transmission, not transmitting, to the UE, during the first PUSCH transmission, a second RRC message including information to configure a non-slot-based repetition operation for a second PUSCH transmission; and
   in a case that the first RRC message includes information to configure a non-slot-based repetition operation, not transmitting, to the UE, during the first PUSCH transmission, a second RRC message including information to configure a slot-based repetition operation for the second PUSCH transmission.

4. The method of claim 3, wherein the information to configure the non-slot-based repetition operation or the information to configure the slot-based repetition operation is indicated by an RRC parameter included in the first RRC message.

5. A user equipment (UE) for performing a physical uplink shared channel (PUSCH) repetition operation, the UE comprising:
   a processor for executing computer-executable instructions; and
   a non-transitory machine-readable medium, coupled to the processor, for storing the computer-executable instructions, wherein the computer-executable instructions instruct the processor to cause the UE to:
   receive, from a base station (BS), a first Radio Resource Control (RRC) message for configuring a first PUSCH transmission;
   perform the first PUSCH transmission;

in a case that the first RRC message includes information to configure a slot-based repetition operation for the first PUSCH transmission, not receive, from the BS, during the first PUSCH transmission, a second RRC message including information to configure a non-slot-based repetition operation for a second PUSCH transmission; and in a case that the first RRC message includes information to configure a non-slot-based repetition operation, not receive, from the BS, during the first PUSCH transmission, a second RRC message including information to configured a slot-based repetition operation for the second PUSCH transmission.

6. The UE of claim 5, wherein the information to configure the non-slot-based repetition operation or the information to configure the slot-based repetition operation is indicated by an RRC parameter included in the first RRC message.

* * * * *